United States Patent
Chahley et al.

(10) Patent No.: US 9,804,608 B2
(45) Date of Patent: Oct. 31, 2017

(54) SYSTEM AND METHOD FOR METERING AGRICULTURAL PRODUCTS

(71) Applicant: CNH Industrial Canada, Ltd., Saskatoon (CA)

(72) Inventors: Dennis W. Chahley, Saskatoon (CA); Gordon Anthony Engel, Saskatoon (CA); Jack Donald Turner, Saskatoon (CA); Dennis George Thompson, Saskatoon (CA); Gregory Jacob Erker, Saskatoon (CA); Trevor Lawrence Kowalchuk, Saskatoon (CA); Anthony Charles Rapley, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 8 days.

(21) Appl. No.: 14/932,178

(22) Filed: Nov. 4, 2015

(65) Prior Publication Data
US 2016/0120097 A1 May 5, 2016

Related U.S. Application Data

(60) Provisional application No. 62/075,006, filed on Nov. 4, 2014.

(51) Int. Cl.
*A01C 7/08* (2006.01)
*G05D 7/06* (2006.01)
(Continued)

(52) U.S. Cl.
CPC ......... *G05D 7/0617* (2013.01); *A01B 79/005* (2013.01); *A01C 7/102* (2013.01); *A01C 21/005* (2013.01); *A01C 7/081* (2013.01)

(58) Field of Classification Search
CPC .... G05D 7/0617; A01C 21/005; A01C 7/102; A01C 7/081; A01B 79/005
(Continued)

(56) References Cited

U.S. PATENT DOCUMENTS

| | | | |
|---|---|---|---|
| 5,025,951 A | 6/1991 | Hook et al. | |
| 6,193,175 B1 * | 2/2001 | Andersson | A01C 21/005 222/608 |

(Continued)

FOREIGN PATENT DOCUMENTS

WO    2014040190    3/2014

OTHER PUBLICATIONS

"Flexi-Coil Seeding for Success," http://agriculture.newholland.com/me/en/Products/Seeding/Documents/IR1401FINB.pdf, CNH International SA. Communications & Advertising, Bts Adv.—printed in Italy Nov. 2011, 32 pages.

(Continued)

*Primary Examiner* — Atul Trivedi
(74) *Attorney, Agent, or Firm* — Rebecca L. Henkel; Rickard K. DeMille

(57) ABSTRACT

A metering system for an air cart includes a metering subassembly having a first meter module configured to meter particulate material from a storage tank of the air cart to a first section of an agricultural implement and a second meter module configured to meter the particulate material from the storage tank of the air cart to a second section of the agricultural implement. The metering system includes a controller having a processor configured to receive a prescription rate map indicative of prescribed product application rates for respective geographic regions of a field, to receive a speed of the agricultural implement, and to independently adjust the first meter module and the second meter module based at least in part on the prescription rate map (Continued)

and the speed to facilitate application of the particulate material at the prescribed product application rates in the respective geographic regions.

20 Claims, 6 Drawing Sheets

(51) Int. Cl.
A01C 21/00 (2006.01)
A01B 79/00 (2006.01)
A01C 7/10 (2006.01)

(58) Field of Classification Search
USPC .......................................................... 701/50
See application file for complete search history.

(56) References Cited

U.S. PATENT DOCUMENTS

| | | |
|---|---|---|
| 6,851,377 B2 | 2/2005 | Mayerle et al. |
| 7,694,638 B1 | 4/2010 | Riewerts et al. |
| 8,166,895 B2 | 5/2012 | Dean et al. |
| 8,281,725 B2 | 10/2012 | Wendte et al. |
| 8,371,238 B2 | 2/2013 | Dean et al. |
| 8,375,873 B2 | 2/2013 | Nelson et al. |
| 8,511,242 B2 | 8/2013 | Applegate et al. |
| 8,601,963 B2 | 12/2013 | Friggstad |
| 8,666,608 B2 | 3/2014 | Friggstad |
| 8,701,576 B2 | 4/2014 | Friggstad |
| 8,714,097 B2 | 5/2014 | Friggstad |
| 8,757,073 B2 | 6/2014 | Beaujot et al. |
| 8,850,997 B2 | 10/2014 | Silbernagel et al. |
| 8,857,353 B2 | 10/2014 | Kowalchuk |
| 8,915,200 B2 | 12/2014 | Barsi et al. |
| 9,119,338 B2 | 9/2015 | Alsater et al. |
| 9,144,190 B2 | 9/2015 | Henry et al. |
| 9,148,990 B2 * | 10/2015 | Redman .............. A01C 7/20 |
| 9,148,994 B1 * | 10/2015 | Eastin ................ A01C 1/06 |
| 2001/0019087 A1 * | 9/2001 | Andersonn ......... A01C 21/005 239/650 |
| 2009/0078178 A1 * | 3/2009 | Beaujot ............... A01C 7/084 111/170 |
| 2009/0241817 A1 * | 10/2009 | Eastin ................ A01C 1/06 111/118 |
| 2010/0299030 A1 * | 11/2010 | Mitchell ............. A01B 79/005 701/50 |
| 2011/0160919 A1 * | 6/2011 | Orr ..................... G05D 7/0676 700/283 |
| 2011/0160920 A1 * | 6/2011 | Orr ..................... A01B 79/005 700/283 |
| 2011/0232177 A1 * | 9/2011 | Eastin ................ A01C 1/04 47/57.7 |
| 2012/0234934 A1 * | 9/2012 | Score .................. E01C 19/203 239/7 |
| 2012/0325131 A1 | 12/2012 | Thompson et al. |
| 2014/0076218 A1 | 3/2014 | Liu |
| 2014/0261116 A1 * | 9/2014 | Redman .............. A01C 7/20 111/174 |
| 2016/0113191 A1 * | 4/2016 | Rosengren ............. A01C 7/06 701/50 |
| 2016/0120102 A1 * | 5/2016 | Roberge .............. A01C 7/081 406/10 |
| 2016/0120104 A1 * | 5/2016 | Chahley .............. A01C 7/081 406/29 |
| 2016/0140367 A1 * | 5/2016 | Dollinger ........... G06K 7/10297 340/10.1 |

OTHER PUBLICATIONS

"Air Drills Air Carts," Case IH, 2006, CNH America LLC, printed in USA, 36 pages.

* cited by examiner

SYSTEM AND METHOD FOR METERING AGRICULTURAL PRODUCTS

CROSS REFERENCE TO RELATED APPLICATIONS

This application claims priority from and the benefit of U.S. Provisional Patent Application No. 62/075,006, entitled "SYSTEM AND METHOD FOR METERING AGRICULTURAL PRODUCTS," filed Nov. 4, 2014, which is hereby incorporated by reference in its entirety.

BACKGROUND

The present application relates generally to agricultural implements, and more specifically, to systems and methods for metering agricultural products.

Generally, seeding implements are towed behind a tractor or other work vehicle and deliver agricultural products (e.g., seed, fertilizer, and/or other particulate material) to a field. In some cases, seeding implements may also be coupled to a product storage tank configured to store agricultural products and a meter configured to regulate a flow of the agricultural products from the product storage tank to the implement. For example, the meter may dispense the agricultural products into multiple distribution lines that distribute the agricultural product to corresponding ground engaging tools disposed across a frame of the seeding implement for deposition of the agricultural product into the soil.

Typical seeding implements include a single meter or may have multiple meters that are controlled together (e.g., rotate at the same rate or meter the agricultural product from the product storage tank into the multiple distribution lines at the same rate). Therefore, the agricultural product is deposited into the soil at a generally uniform rate across the seeding implement. Unfortunately, such seeding implements do not enable product application rates to vary across the seeding implement, which may result in undesirable application of agricultural product to certain portions of the field, product overlap, and/or inadequate product deposition, which may in turn result in wasted product or reduced overall yield.

SUMMARY OF THE INVENTION

In one embodiment, a metering system for an air cart includes a first metering subassembly having a first meter module configured to meter particulate material from a storage tank of the air cart to a first section of an agricultural implement and a second meter module configured to meter the particulate material from the storage tank of the air cart to a second section of the agricultural implement. The metering system includes a controller having a processor configured to receive a prescription rate map indicative of prescribed product application rates for respective geographic regions of a field, to receive a speed of the agricultural implement, and to independently adjust the first meter module and the second meter module based at least in part, on the prescription rate map and the speed as the agricultural implement travels through the field to facilitate application of the particulate material at the prescribed product application rates in the respective geographic regions of the field.

In one embodiment, a metering system for an air cart includes a metering subassembly having a first meter module configured to meter particulate material from a storage tank of the air cart to a first section of an agricultural implement and a second meter module configured to meter the particulate material from the storage tank of the air cart to a second section of the agricultural implement. The metering system also includes a controller having a processor configured to receive a prescription rate map indicative of a first prescribed product application rate for the particulate material across a first geographic region of a field and a second prescribed product application rate for the particulate material across a second geographic region of the field and to receive signals indicative of respective geographic locations of the first section and the second section relative to the field. The controller is also configured to independently adjust the first meter module and the second meter module based at least in part on the prescription rate map and the respective geographic locations as the agricultural implement travels through the field. The processor is further configured to determine a blended product application rate from the first prescribed product application rate and the second prescribed product application rate while the first section is located within both the first region and the second region of the field, and to adjust the first meter module to facilitate application of the particulate material at the blended product application rate while the first section is located in both the first region and the second region of the field.

In one embodiment, a method for metering particulate material from an air cart to an agricultural implement includes receiving, at a processor of a metering system, a prescription rate map indicative of prescribed product application rates for the particulate material for respective geographic regions of a field. The method also includes receiving, at the processor, signals indicative of respective geographic locations of a first section and a second section of the agricultural implement relative to the field, wherein the first section and the second section each comprise one or more row units configured to deposit the particulate material into the field. The method further includes receiving, at the processor, a signal indicative of a speed of the agricultural implement, and adjusting, using the processor, a first metering rate of a first meter module configured to meter the particulate material from the air cart to the first section and a second metering rate of a second meter module configured to meter the particulate material from the air cart to the second section based at least in part on the prescription rate map, the signals indicative of the respective geographic locations of the first section and the second section, and the signal indicative of the speed of the agricultural implement. The first metering rate and the second metering rate enable the one or more row units of the first section and the one or more row units of the second section to deposit the particulate material into the field at the prescribed product application rates in respective geographic regions of the field.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
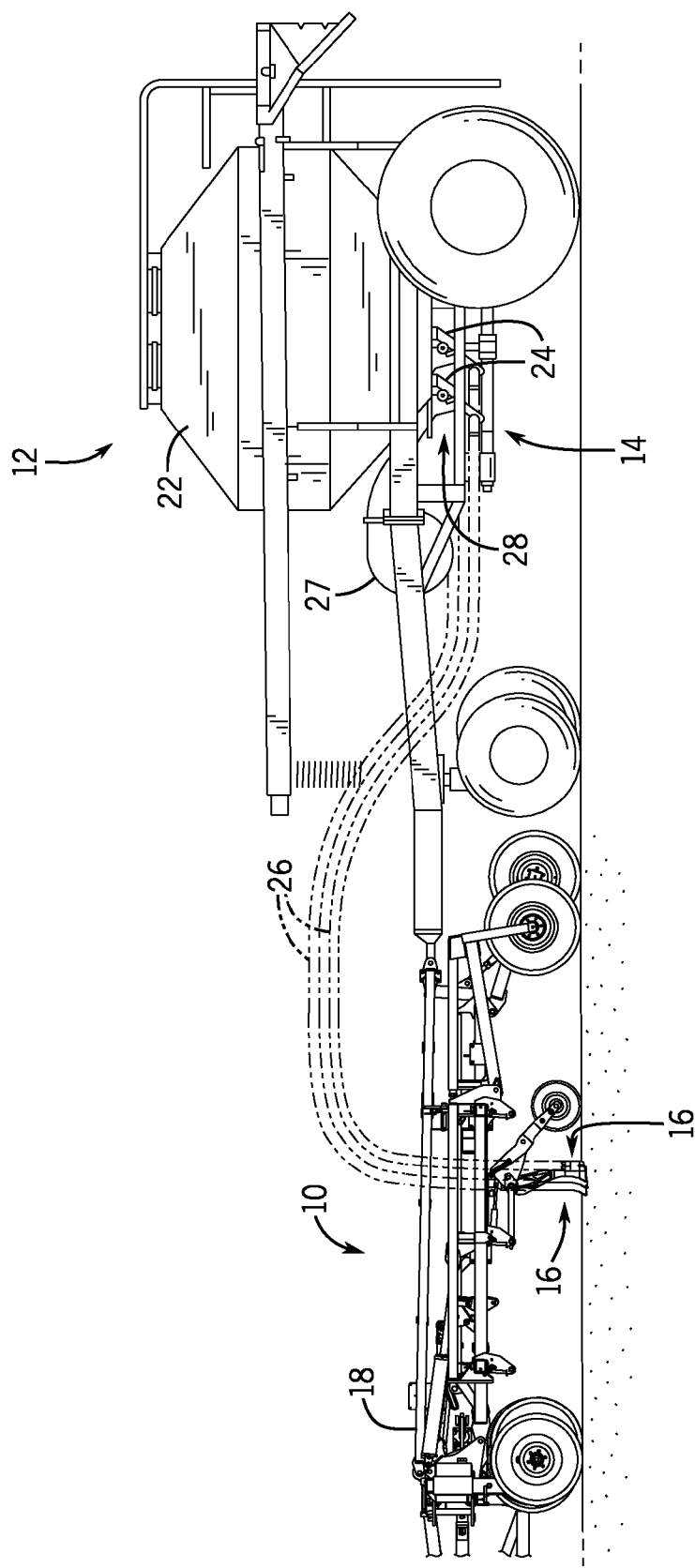
FIG. 1 is a side view of an embodiment of an agricultural implement coupled to an air cart having a metering system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments disclosed herein relate generally to systems and methods for metering agricultural products (e.g., seed, fertilizer, and/or other particulate products). In particular, disclosed embodiments include an air cart coupled to an agricultural implement (e.g., a seeding or tilling implement). The air cart includes one or more product storage tanks. The air cart also includes a metering system having a metering subassembly configured to be coupled to each product storage tank. Additionally, each metering subassembly includes multiple meter modules configured to meter (e.g., regulate the flow of) agricultural product from the corresponding product storage tank into product distribution lines (e.g., primary distribution lines, each of which may be coupled to one or more secondary distribution lines). The product distribution lines are configured to distribute the agricultural product to corresponding row units of the agricultural implement. The row units may include various ground engaging tools having outlets for depositing the agricultural product into soil as the agricultural implement travels through a field.

The metering system disclosed herein includes a controller configured to independently (e.g., separately) control each meter module of the one or more metering subassemblies. Thus, each meter module may meter the agricultural product at a unique and/or independently variable rate to corresponding product distribution lines and to corresponding row units. Such a configuration enables variation in product deposition rates across a width of the implement. Such a configuration also enables the controller to control each meter module to meter the agricultural product based on various inputs, such as a predetermined rate map (e.g., prescription rate map), to facilitate deposition of the agricultural product into the soil at a variety of desired (e.g., prescribed or predetermined) product application rates for different geographic regions (e.g., zones) of the field. For example, an operator may wish to deposit seed at one rate in a moist, flat region of the field and to deposit seed at a different rate in a rocky, inclined region of the field. The disclosed metering system may receive inputs (e.g., prescription rate map) from the operator (or via any other suitable source) indicative of desired application rates for the different geographic regions of the field and location information (e.g., from a global positioning system (GPS)) as the implement travels across the field. The metering system may then determine an appropriate metering rate (e.g., meter roller rotational speed) for each meter module based on the desired application rates and location information. Additionally, the metering system may adjust each meter module to the appropriate metering rate to facilitate application of the agricultural products at the desired application rates for each geographic region of the field, for example. Accordingly, the disclosed embodiments enable fine control of product application rates and facilitate precise application of agricultural product at the desired product application rates across the different geographic regions of the field. Additionally, the disclosed embodiments may reduce undesirable product overlap and/or inadequate product deposition in certain portions of the field, which may in turn reduce product waste and lead to improved overall yield.

With the foregoing in mind, FIG. 1 is a side view of an embodiment of an agricultural implement 10 (e.g., a seeding or tilling implement) coupled to an air cart 12 having a metering system 14. The implement 10 includes multiple row units 16 supported by a frame 18. Each row unit 16 is configured to receive agricultural product (e.g., seed, fertilizer, and/or other particulate material) from the metering system 14 of the air cart 12 and to deposit the agricultural product into the soil as the implement 10 travels across a field. As shown, the air cart 12 is coupled to the implement 10 via the frame 18. The air cart 12 may include one or more product storage tanks 22 configured to store one or more agricultural products. Each product storage tank 22 is coupled to a corresponding metering subassembly 28, which includes multiple meter modules 24 each coupled to a corresponding primary product distribution line 26 (e.g., primary lines) that is configured to distribute agricultural product to one or more corresponding row units 16 of the implement 10. In particular, an air source 27 is provided to provide an air flow to each of the primary lines 26. The metered agricultural product is entrained within the air flow and pneumatically transferred to the one or more corresponding row units 16 of the implement 10. While two meter modules 24 and two primary lines 26 are shown for clarity, it should be appreciated that, in certain embodiments each metering subassembly 28 may include at least 4, 6, 8, 9, 10, 12, or more meter modules 24 and/or primary lines 26. Furthermore, one metering module 24 may provide the agricultural product to one or more primary lines 26 (e.g., a subset of the primary lines 26). Additionally, while two row units 16 are shown for clarity, it should be appreciated that, in certain embodiments the implement 10 may include at least 4, 6, 8, 9, 10, 20, 30, 40, 50, 60, 70, 80, 90, 96, or more row units 16, and furthermore, that each primary line 26 may provide the agricultural product to any suitable number (e.g., 1, 2, 3, 4, 5, 6, 7, 8, 9, 10, or more) of row units 16 and/or any suitable number of outlets configured to deposit product into the field. Similarly, while one product storage tank 22 is illustrated, it should be appreciated that, in certain embodiments the air cart 12 may include at least 2, 3, 4, 5, 6 or more product storage tanks 22. In FIG. 1, the air cart 12 is coupled to the implement 10, and towed behind the implement 10. As will be appreciated, in certain embodiments, the air cart 12 may be towed directly behind a tow vehicle, with the implement 10 towed behind the air cart 12. Likewise, the implement 10 and the air cart 12 may be part of a single unit, or the implement 10 and the air cart 12 may be separate units that are coupled together.

As discussed in more detail below, the metering system 14 is configured to receive various inputs, such as a prescription rate map, and to control each of the multiple meter modules 24 individually (e.g., separately) based on the inputs. For example, in some cases, an operator may wish to apply the agricultural product at a first rate to one region of a field and to apply the agricultural product at a second rate, different from the first rate, to another region of the field. The metering system 14 may be configured to receive inputs indicative of the desired product application rates across the field (e.g., via a prescription map) and to determine appropriate metering rates (e.g., meter roller turn rates or rotational speed) for each of the meter modules 24. The metering system 14 may then separately control each of the meter modules 24 to meter the agricultural product at the respective appropriate metering rate such that the agricultural product is applied via the ground engaging tools 16 at the desired product application rate within each region as the implement 10 travels across the field.

Figure 2:
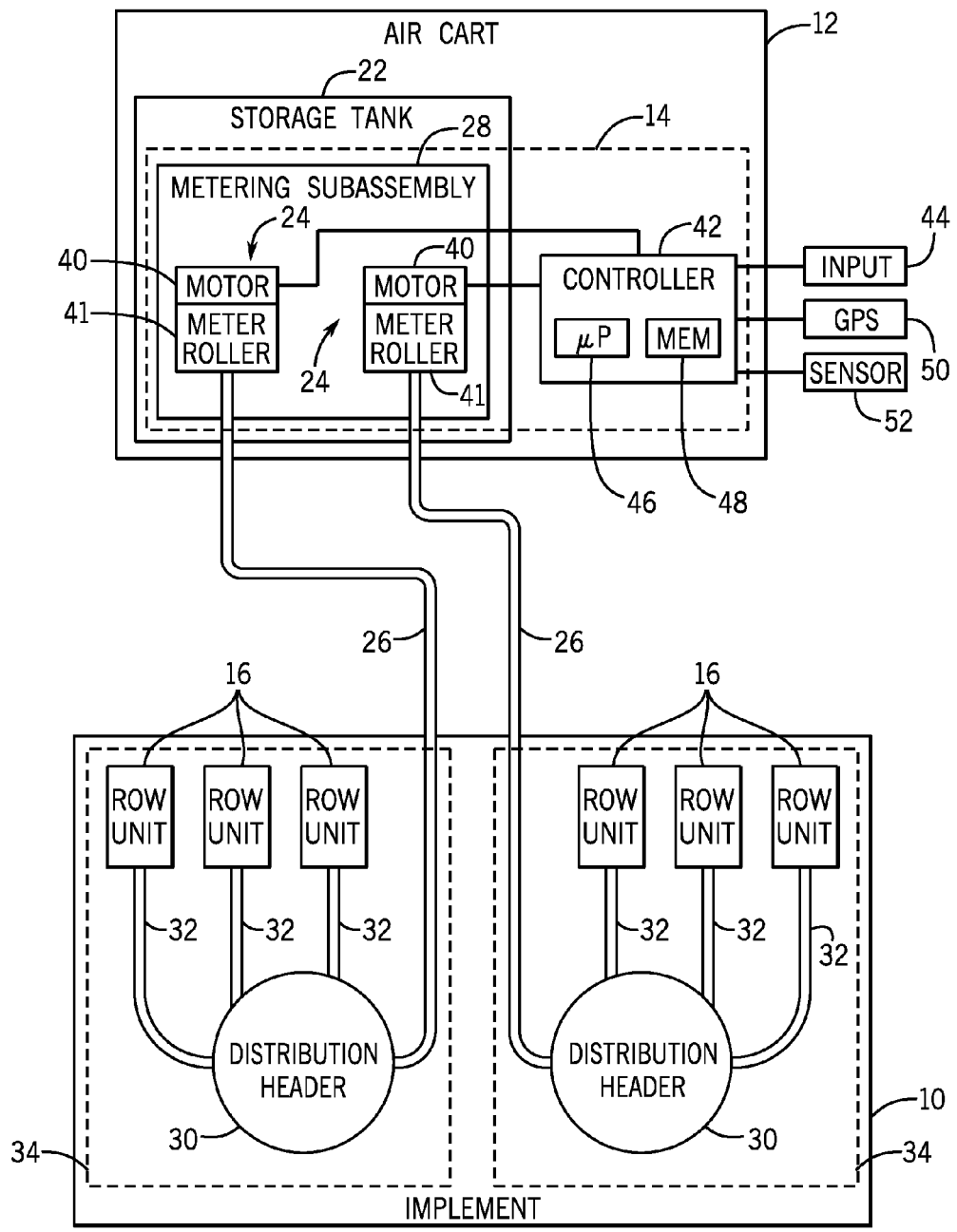
FIG. 2 is a schematic diagram of a portion of an embodiment of the agricultural implement and the air cart of FIG. 1.

FIG. 2 is a schematic diagram of a portion of an embodiment of the implement 10 and the air cart 12. To facilitate discussion, one product storage tank 22 and its corresponding metering subassembly 28 is shown. However, it should be understood that the air cart 12 may include any suitable number of storage tanks 22, and the metering system 14 may provide one metering subassembly 28 for each storage tank 22. As shown, the metering subassembly 28 includes two meter modules 24 (e.g., a first metering module and a second metering module), although the metering subassembly 28 may include any suitable number of meter modules 24, as noted above. In the illustrated embodiment, each meter module 24 is configured to meter the agricultural product into a corresponding primary line 26. Additionally, each primary line 26 is configured to direct the agricultural product to a distribution header 30 of the implement 10, and the distribution header 30 is configured to distribute the agricultural product into one or more corresponding secondary lines 32 extending to a corresponding row unit 16. Each metering module 24 and corresponding primary line 26 may thus provide agricultural product to separate sections 34 (e.g., a first section and a second section) of the implement 10. Because each metering module 24 may be separately controlled, the row units 16 of one section 34 may apply the agricultural product at a different rate than the row units 16 of another section 34. Thus, the agricultural product may be applied at different rates across a width of the implement 10, and the application rate provided by each section 34 may be adjusted independently as the implement 10 travels across the field. As noted above, it should be appreciated that although each metering module 24 is shown coupled to a single corresponding primary line 26, in some embodiments, each metering module 24 may be coupled to two or more primary lines 26, and thus may deliver product to two or more sections 34 (e.g., a subset of sections 34), for example.

As shown, each metering module 24 includes an actuator 40 (e.g., motor) configured to actuate (e.g., drive rotation of) a respective meter roller 41 (e.g., meter). In some embodiments, each motor 40 may drive rotation of a drive shaft coupled to the respective meter 41. Although each meter module 24 includes the motor 40, in some embodiments, the respective meter roller 41 of each metering module 24 may be driven into rotation via any suitable mechanism. The metering system 14 also includes a controller 42 that may be located on the air cart 12 and/or be communicatively coupled to each metering subassembly 28. The controller 42 is configured to control each motor 40 to adjust a metering rate (e.g., meter roller turn rate) of its respective meter module 24. In certain embodiments, the controller 42 is an electronic controller having electrical circuitry configured to process signals (e.g., signals indicative of a prescription rate map and/or prescribed application rates) from an input 44 (e.g., map or rate input, position, speed, product delay, width and/or geometry of respective geographic regions of the field) and/or from other components of the metering system 14. For example, the input 44 may be configured to provide signals indicative of desired product application rates for various regions of the field. In some embodiments, the input 44 may be a controller having a processor and a memory, and the input 44 may be configured to determine target application rates (e.g., in units of mass per area) and to provide the target application rates to the controller 42. In some such cases, the controller 42 may utilize the target application rates, ground speed information, section width and/or geometry of respective regions of the field, meter calibration information (e.g., units of mass applied per revolution of the meter roller 41) to determine an rotational speed at which to drive the meter roller 41. In some embodiments, the controller 42 may provide a speed command to each motor 40, which may have an internal processor configured to translate the speed command from the controller 42 and to vary the motor speed accordingly to achieve the desired product application rate.

In the illustrated embodiment, the controller 42 includes a processor, such as the illustrated microprocessor 46, and a memory device 48. The controller 42 may also include one or more storage devices and/or other suitable components. The processor 46 may be used to execute software, such as software for controlling the metering system 14. Moreover, the processor 46 may include multiple microprocessors, one or more "general-purpose" microprocessors, one or more special-purpose microprocessors, and/or one or more application specific integrated circuits (ASICS), or some combination thereof. For example, the processor 46 may include one or more reduced instruction set (RISC) or complex instruction set (CISC) processors.

The memory device 48 may include a volatile memory, such as random access memory (RAM), and/or a nonvolatile memory, such as ROM. The memory device 48 may store a variety of information and may be used for various purposes. For example, the memory device 48 may store processor-executable instructions (e.g., firmware or software) for the processor 46 to execute, such as instructions for controlling the metering system 14. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., a prescription rate map, location data, implement speed data, or the like), instructions (e.g., software or firmware for controlling the metering system 14, or the like), and any other suitable data. The processor 46 and/or memory device 48, or an additional processor and/or memory device, may be located in any suitable portion of the system. For example, a memory device storing instructions (e.g., software or firmware for controlling portions of the metering system 14, or the like) may be located in or associated with each motor 40.

As discussed in more detail below, the controller 42 of the metering system 14 may be configured to receive signals indicative of a prescription rate map, or any other suitable data indicative of desired product application rates to different geographic regions of the field, via the input 44. For example, an operator may generate and/or input a prescription rate map by prescribing (e.g., setting or assigning) various desired product application rates for various geographic regions of the field. The prescription rate map may be generated based on any suitable factors, such as previous yield (e.g., a yield map of respective geographic regions of the field determined during a previous planting season), soil conditions, type of agricultural product, or any combination thereof. As the implement 10 moves across the field, the controller 42 of the metering system 14 may also receive signals indicative of a geographic location of the implement 10 relative to the field via a global positioning system (GPS) sensor 50, or any other suitable sensor. In some embodiments, the GPS sensor 50 may be disposed on a tractor towing the implement 10, and the geographic location of the implement 10 and the various row units 16 and/or sections 34 relative to the field may be derived by the controller 42 based on data related to the location of these components relative to the GPS sensor 50 on the tractor. In certain embodiments, the GPS sensor 50 may be disposed on the air cart 12 or the implement 10. In some cases, multiple GPS sensors 50 may be disposed on the implement 10, such as at each section 34 to facilitate determination of the geographic location of each row unit 16 and/or section 34 relative to the field as the implement 10 travels across the field.

As discussed in more detail below, based on the prescription rate map and the geographic location of each row unit 16 and/or section 34, the controller 42 of the metering system 14 automatically determines an appropriate metering rate for each meter module 24 and adjusts each meter module 24 to the appropriate metering rate such that the agricultural product is applied according to the prescribed product application rate (e.g., the prescription rate map) for respective geographic regions of the field as the implement 10 travels across the field. Because the disclosed embodiments enable sectional control (e.g., each meter module 24 is independently controllable to provide the desired agricultural product flow rate to the corresponding section 34), the agricultural product may be more precisely applied according to the prescription rate map.

In certain embodiments, the controller 42 of the metering system 14 may be configured to receive additional inputs to facilitate precise application of the agricultural product to the various geographic regions of the field at the prescribed rates. For example, as shown, the controller 42 may receive a signal indicative of a speed of the implement 10 from the GPS sensor 50 and/or from a separate speed sensor 52, which may be disposed at any suitable location. The speed of the implement 10 may enable the controller 42 to determine when to adjust the meter module 24 such that the rate at which the product is applied to the field changes to the prescribed product application rate for a particular region as the row units 16 travel into that particular region. In certain embodiments, additional data may be input or stored (e.g., within the memory 48) of the controller 42 to facilitate precise application of the agricultural product to the various regions of the field at the prescribed rates. For example, a product delivery time (e.g., a time for the agricultural product to travel from the meter module 24 to corresponding row units 16) may vary for each section 34 of the implement. For example, the time to deliver the agricultural product from the meter modules 24 to sections 34 disposed on laterally outward ends of the implement 10 may be greater than the time to deliver the agricultural product from the meter modules 24 to sections 34 disposed proximate to the air cart 12 (e.g., at a laterally inward position of the implement 10). Accordingly, the product delivery time for each section 34 may be input or stored (e.g., within the memory 48) of the controller 42 and may be utilized by the controller 42, in conjunction with the speed of the implement 10, to determine when to adjust the meter module 24 such that the rate at which the product is applied to the field changes to the prescribed product application rate for a particular region as the row units 16 travel into that particular region.

Figure 3:
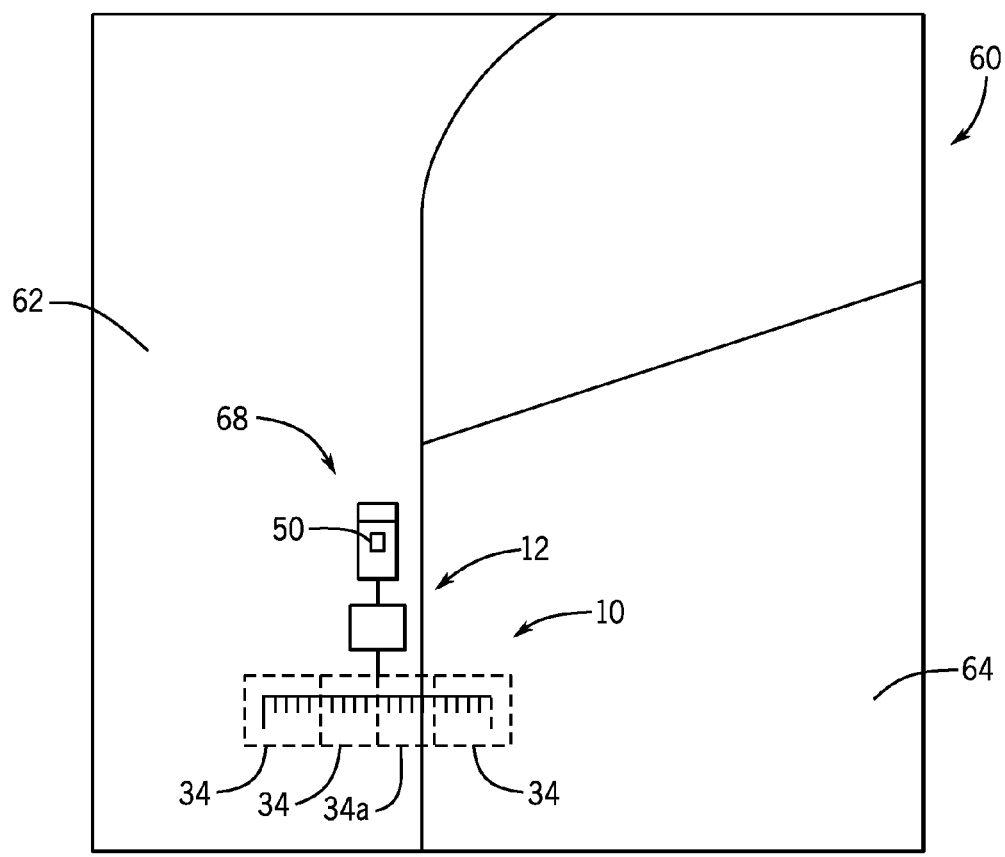
FIG. 3 is a schematic diagram of an embodiment of the agricultural implement and the air cart of FIG. 1 being towed through a field.

FIG. 3 is a schematic diagram of an embodiment of the agricultural implement 10 and the air cart 12 being towed through a field 60. For purposes of discussion, the field 60 is shown overlaid with a prescription rate map, which is indicative of different prescribed product application rates for various regions of the field. For example, the prescription rate map indicates a first prescribed product application rate for a first region 62 of the field 60 and a second prescribed product application rate for a second region 64 of the field 60. As noted above, in certain embodiments, the prescription rate map may be provided to the controller 42 of the metering system 14 of the air cart 12. As the implement 10 is towed through the field 60 by a tractor 68, the controller 42 may also receive location information from the GPS sensor 50. Based on the prescription rate map and the derived location of each row unit 16 and/or section 34, the controller 42 may determine an appropriate metering rate for each meter module 24. Additionally, the controller 42 may independently adjust each meter module 24 to the appropriate metering rate to output the agricultural product at the various prescribed rates to each region of the field 60 via respective sections 34 of the implement 10. As noted above, the controller 42 may also receive signals indicative of the speed of the implement 10 and/or the product delivery time for each section 34, and may utilize such signals and/or data to adjust each meter module 24.

Additionally, during some passes across the field 60, one or more sections 34 of the implement 10 may be disposed over (e.g., straddle) two different regions. For example, in the illustrated embodiment, one section 34a is disposed over both the first region 62 and the second region 64. In some such cases, the controller 42 may be configured to determine a percentage of row units 16 of the section 34a disposed over each of the regions 62, 64 and to adjust the meter module 24 to deliver the agricultural product at either the first rate or the second rate based on whether a greater percentage of the row units 16 of the section 34a are in the first region 62 or the second region 64, for example. For example, if more than 50 percent of the row units 16 of the section 34a are located within the first region 62, then the controller 42 may adjust the corresponding meter module 24 to deliver the agricultural product at the first rate. In certain cases, the controller 42 may be configured to average the prescribed product application rates for the two different regions 62, 64 and to adjust the meter module 24 such that the agricultural product is applied via the row units 16 of the corresponding section 34a at the average of the prescribed first and second rates. In some embodiments, the controller 42 may be configured to use the prescription map and/or location information to determine a blended prescribed rate and to control the meter module 24 such that the agricultural product is applied via the row units 16 of the corresponding section 34a at the blended prescribed rate. In some embodiments, the controller 42 may perform linear interpolation to determine the blended application rate. For example, the controller 42 may determine the blended product application rate based on a first percent overlap between the section 34a and the first region 60 and a second percent overlap between the section 34a and the second region 62. By way of further example, the controller 42 may determine the blended product application rate based on a product between a first ratio and a second ratio, where the first ratio is a ratio of the first rate to the first percent overlap and the second ratio is a ratio of the second rate to the second percent overlap. Thus, by way of example, in the illustrated embodiment, two sections 34 are within the first region 62 and the corresponding meter modules 24 are controlled to apply the agricultural product at the first rate, one section 34 is within the second region 64 and the corresponding meter module 24 is controlled to apply the agricultural product at the second rate, and one section 34a straddles the first and second regions 62, 64 and the corresponding meter module 24 may be controlled at either the first rate, the second rate, the average rate, or the blended rate.

Figure 4:
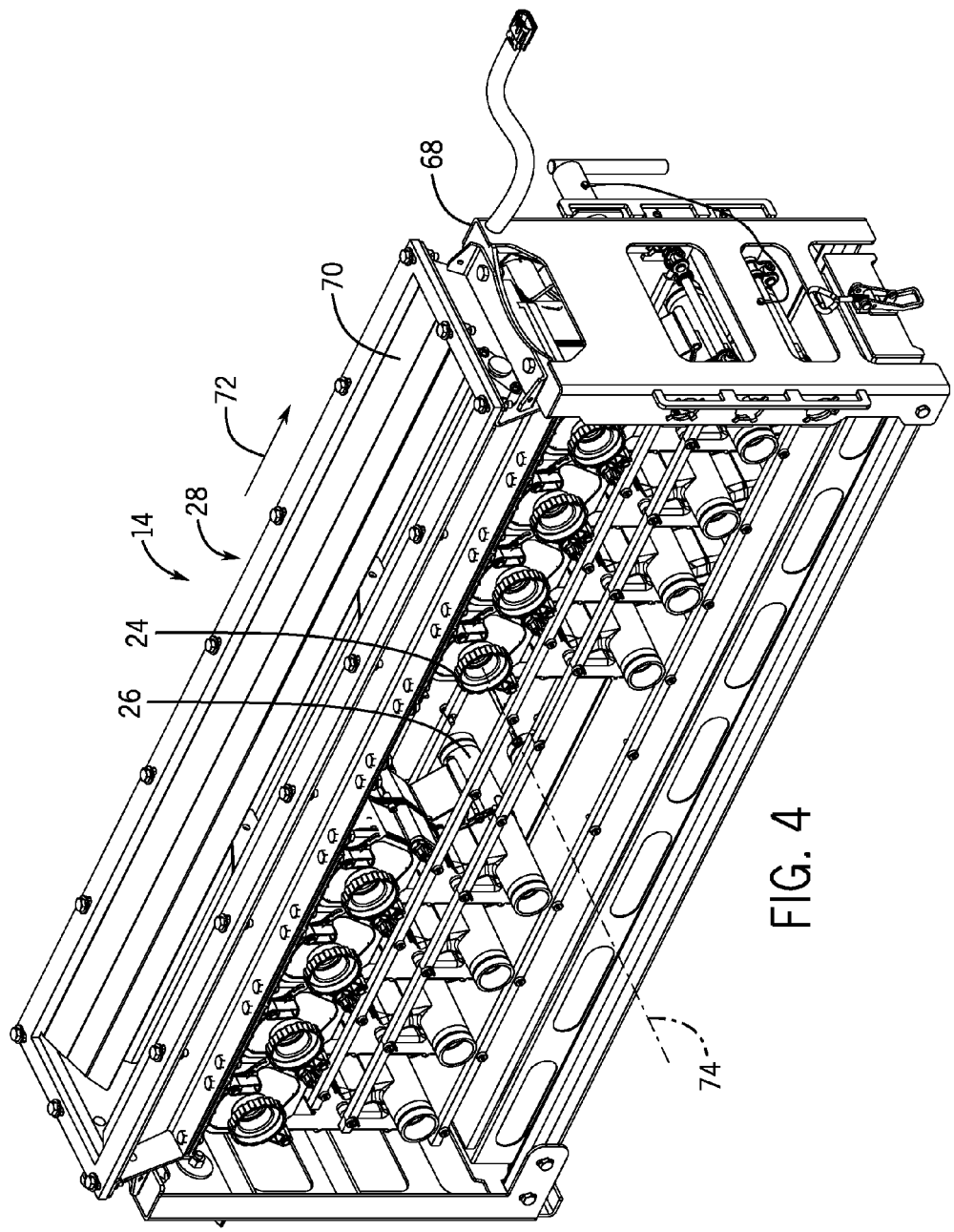
FIG. 4 is a perspective view of a portion of an embodiment of the metering system of the air cart of FIG. 1.

FIG. 4 is a perspective view of a portion of an embodiment of the metering system 14 of the air cart 12. In particular, FIG. 4 illustrates a portion of one metering subassembly 28 having multiple, independently-controlled meter modules 24, which enable precise application of agricultural product to the field at prescribed rates (e.g., according to a prescription rate map). As shown, the metering subassembly 28 includes a frame 68 supporting a hopper 70, which is configured to direct the agricultural product from the corresponding storage tank 22 (shown in FIG. 1) toward the meter modules 24. The meter modules 24 are positioned adjacent to one another along a lateral axis 72 of the frame 68. Each meter module 24 includes the meter roller 41 (e.g., fluted roller having spiral or straight flutes), shown in FIG. 2, configured to rotate about a rotational axis 74, which may be generally perpendicular to the lateral axis 72 of the frame 68. In some embodiments, the lateral axis 72 of the frame 68 may be generally perpendicular to a direction of travel of the air cart 12 and/or the rotational axis 74 may be generally parallel to the direction of travel of the air cart 12. In other embodiments, the lateral axis 72 of the frame 68 may be generally parallel to the direction of travel of the air cart 12 and/or the rotational axis 74 may be generally perpendicular to the direction of travel of the air cart 12. Each meter module 24 is coupled to a corresponding primary line 26, although as noted above, each meter module 24 may be coupled to two or more primary lines 26 in some embodiments, and thus may deliver product to a subset of the primary lines 26 and/or sections 34.

Figure 5:
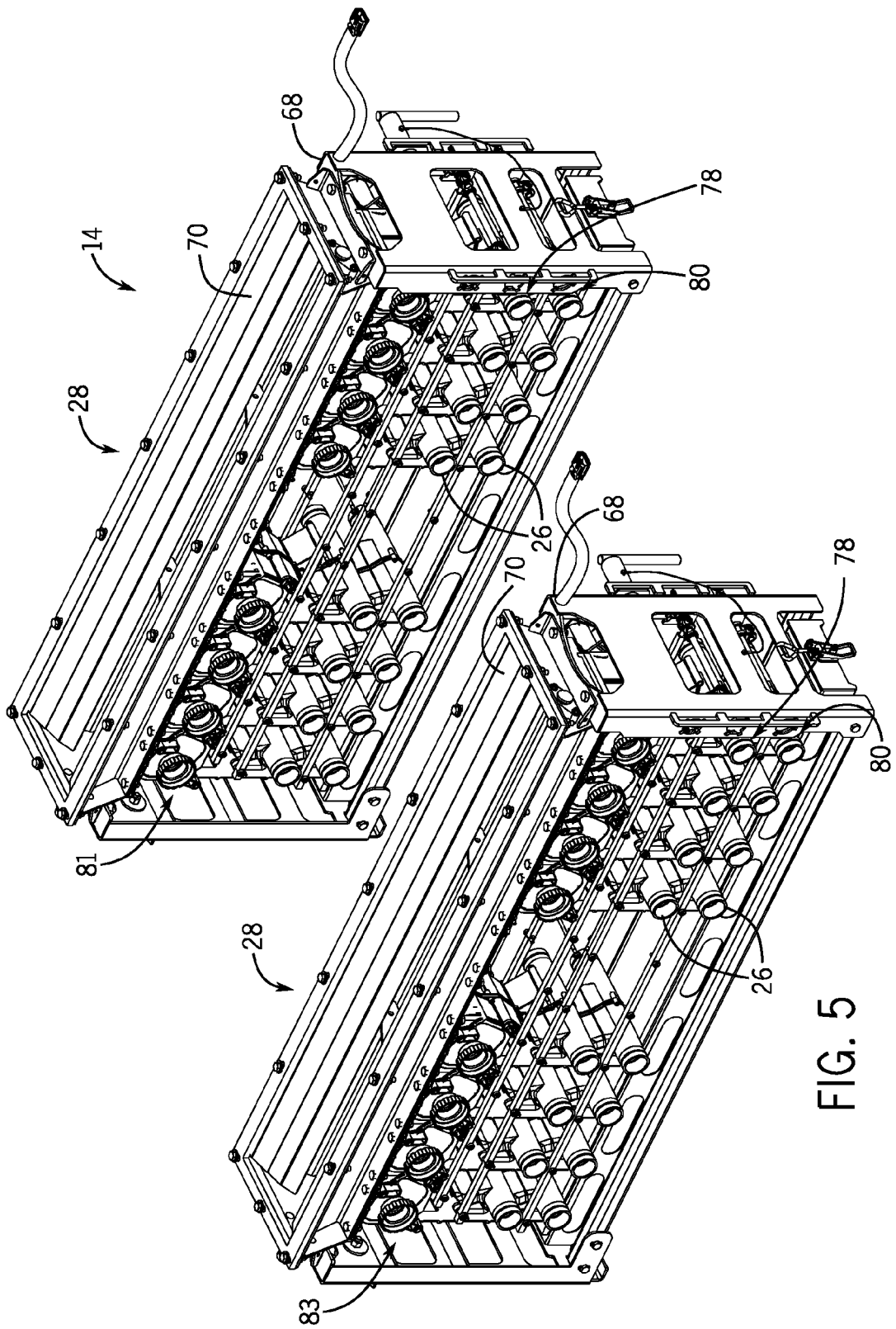
FIG. 5 is a perspective view of a portion of an embodiment of a metering system configured to meter agricultural products from multiple product storage tanks of an air cart.

FIG. 5 is an exploded perspective view of a portion of an embodiment of the metering system 14 configured to meter agricultural products from multiple product storage tanks 22 (shown in FIG. 1) of the air cart 12. In particular, FIG. 5 illustrates two metering subassemblies 28 (e.g., one metering subassembly 28 is provided for each product storage tank 22), each having multiple, independently controllable meter modules 24. In certain embodiments, it may be desirable to deliver two different agricultural products (e.g., seed and fertilizer) to the field. In such cases, the air cart 12 may include two storage tanks 22 (or a single, compartmentalized storage tank 22) each storing the different agricultural products (e.g., seed and fertilizer) and each coupled to a respective metering subassembly 28. Each metering subassembly 28 includes the frame 68 supporting a corresponding hopper 70 and the corresponding meter modules 24. Additionally, as shown, each metering subassembly 28 includes an upper set of connectors 78 for upper primary lines 26 and a lower set of connectors 80 for lower primary lines 26. One agricultural product may be metered by a first group 81 of meter modules 24 of a first metering subassembly 28 from one storage tank 22 into the upper set of connectors 78 for upper primary lines 26, while the other agricultural product may be metered by a second group 83 of meter modules 24 of a second metering subassembly 28 from the other storage tank 22 into the lower set of connectors 80 for lower primary lines 26. The upper and the lower primary lines 26 may each distribute the products to corresponding row units 16 and sections 34 of the implement 10. For example, in some embodiments, one primary line 26 in the upper set 78 may distribute seed and one primary line 26 in the lower set 80 may distribute fertilizer to corresponding row units 16 of a single section 34, thus enabling application of both seed and fertilizer to the field by each row unit 16 and/or by each section 34.

As discussed above, each of the meter modules 24 may be independently controlled. Thus, each of the meter modules 24 of the first metering subassembly 28 for distributing one agricultural product may be independently controlled from each of the meter modules 24 of the second metering subassembly 28 for distributing the other agricultural product. Accordingly, the metering system 14 may be configured to distribute one agricultural product to the field according to a first prescription rate map (e.g., by independently controlling each of the meter modules 24 of the first metering subassembly 28) and to distribute the other agricultural product to the field according to a second prescription rate map (e.g., by independently controlling each of the meter modules 24 of the second metering subassembly 28), in the manner discussed in detail above.

Figure 6:
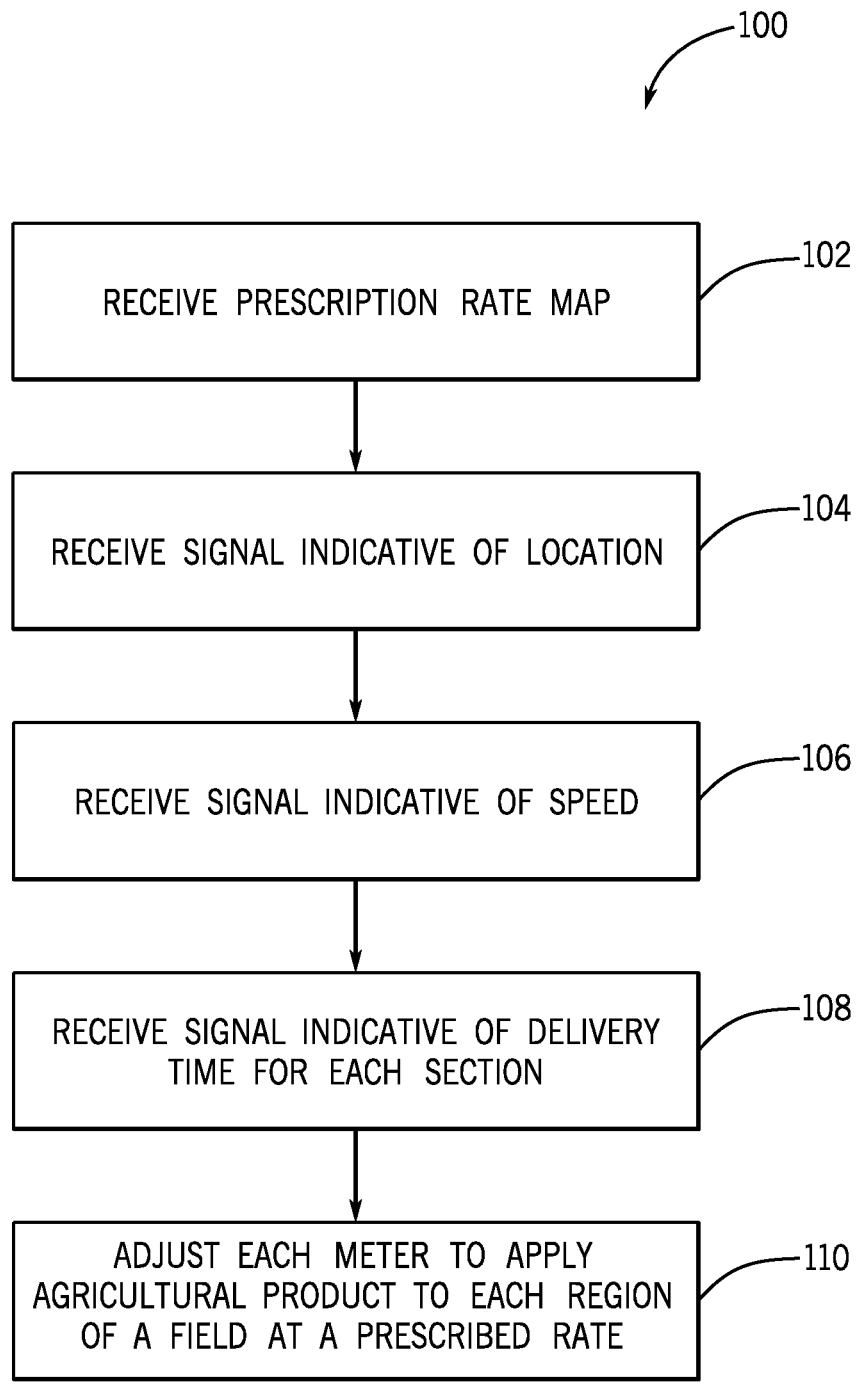
FIG. 6 is a flow diagram of an embodiment of a method for metering agricultural products using the metering system of the air cart of FIG. 1.

FIG. 6 is a flow diagram of an embodiment of a method 100 for metering agricultural products using the metering system 14 of the air cart 12. The method 100 may be performed as an automated procedure by a system, such as the metering system 14. Although the flow diagram illustrates the steps in a certain sequence, it should be understood that the steps may be performed in any suitable order and certain steps may be carried out simultaneously, where appropriate. Further, certain steps shown in FIG. 6 may be omitted and additional steps may be added.

As shown, in step 102, a prescription rate map, or signals indicative of the prescription rate map or prescribed product application rates for various regions of the field, is received at the controller 42. The prescription rate map may be input by the operator directly into the metering system 14 via the input 44, or may be received from an external device (e.g., computing device) via a wired or wireless connection, for example. The prescription rate map may be generated by an operator (or by the controller 42 or other computing device) based on any suitable factor or combination of factors, such as previous yield (e.g., yield from the various regions of the field during previous planting seasons), soil conditions, operator preferences, or the like. The prescription rate map is indicative of prescribed product application rates for respective regions of the field.

In step 104, a signal indicative of a location of the implement 10 is received at the controller 42. As noted above, as the implement 10 moves across the field, the metering system 14 may receive signals indicative of the location of the implement 10 via the GPS sensor 50, or any other suitable sensor. The GPS sensor 50 may be disposed on a tractor towing the implement 10, and the location of the implement 10 and the various row units 16 and/or sections 34 may be derived based on data related to the location of these components relative to the GPS sensor 50 on the tractor. In certain embodiments, the GPS sensor 50 may be disposed on the air cart 12 or the implement 10. In some cases, multiple GPS sensors 50 may be disposed on the implement 10, such as at each section 34 to facilitate determination of the location of each row unit 16 and/or section 34 as the implement 10 travels across the field.

In step 106, a signal indicative of a speed of the implement 10 is received at the controller 42. The speed may be obtained via any suitable sensor, such as the speed sensor 52 or the GPS sensor 50. As noted above, the speed of the implement 10 may enable the controller 42 to determine when to adjust each meter module 24 (e.g., when to adjust the rotational speed of the meter module 24 to vary the product application rate) such that the rate at which the product is applied to the field changes to the prescribed product application rate for a particular region as the row units 16 travel into that particular region.

In step 108, a product delivery time (e.g., a time for the agricultural product to travel from the meter module 24 to corresponding row units 16) for each section 34 may be received by the controller 42 and/or accessed from the memory 48 of the controller 42. The product delivery time for each section 34 may be utilized by the controller 42 to determine when to adjust each meter module 24 such that the rate at which the product is applied to the field changes to the prescribed product application rate for a particular region as the row units 16 of the section 34 travel into that particular region.

In step 110, the controller 42 may independently adjust each meter module 24 (e.g., by controlling each motor 40 to adjust the corresponding meter roller 41 of the meter module 24) to apply the agricultural product to each region of the field at the prescribed product application rates as the implement 10 travels through the field based at least in part on the prescription rate map, the signals indicative of the location of the implement 10, the signal indicative of the speed of the implement 10, and/or the product delivery times. Because each meter module 24 may be independently controlled, the disclosed embodiments enable precise output of the agricultural product at the prescribed product application rates to respective regions of the field. Additionally, as noted above with respect to FIG. 5, the disclosed embodiments may enable precise output of multiple different agricultural products at respective prescribed product application rates to the regions of the field.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A metering system for an air cart, comprising:
a first metering subassembly, comprising:
  a first meter module configured to meter particulate material from a storage tank of the air cart to a first section of an agricultural implement;
  a second meter module configured to meter the particulate material from the storage tank of the air cart to a second section of the agricultural implement;
a controller having a processor configured to:
  receive a prescription rate map indicative of prescribed product application rates for respective geographic regions of a field;
  receive a speed of the agricultural implement;
  independently adjust the first meter module and the second meter module based at least in part on the prescription rate map and the speed as the agricultural implement travels through the field to facilitate application of the particulate material at the prescribed product application rates in the respective geographic regions of the field; and
a second metering subassembly having a third meter module and a fourth meter module, wherein the third meter module and the fourth meter module are configured to meter a second particulate product from a second storage tank to the first section and to the second section of the agricultural implement, respectively.

2. The metering system of claim 1, wherein the processor is configured to receive a first product delivery time indicative of a time to deliver the particulate material from the storage tank to the first section, and the processor is configured to adjust the first meter module based at least in part on the first product delivery time as the agricultural implement travels through the field.

3. The metering system of claim 1, wherein the processor is configured to receive signals indicative of respective geographic locations of the first section and the second section relative to the field, and to adjust the first meter module and the second meter module based at least in part on the respective geographic locations as the agricultural implement travels through the field.

4. The metering system of claim 3, wherein the processor is configured to receive the signals indicative of the respective geographic locations of the first section and the second section via a global positioning system sensor disposed on a tractor configured to tow the air cart.

5. The metering system of claim 3, wherein the processor is configured to receive the signal indicative of respective geographic locations of the first section and the second section via a global positioning system sensor disposed on the agricultural implement.

6. The metering system of claim 1, wherein each of the first meter module and the second meter module comprise a fluted meter roller.

7. The metering system of claim 6, wherein each fluted meter roller is configured to rotate about a rotational axis disposed generally parallel to a direction of travel of the air cart.

8. The metering system of claim 1, wherein the processor is configured to receive a second prescription rate map indicative of prescribed product application rates for the second particulate product for respective geographic regions of the field, and to adjust the third meter module and the fourth meter module based at least in part on the second prescription map and the speed as the agricultural implement travels through the field to facilitate application of the particulate material at the prescribed product application rates in the respective geographic regions of the field.

9. The metering system of claim 1, wherein the prescription rate map is generated based at least in part on a yield map of the respective geographic regions of the field determined during a previous planting season.

10. The metering system of claim 1, wherein the first meter module is configured to meter the particulate material from the storage tank into a corresponding primary line configured to pneumatically transfer the particulate material in an air flow from the first meter module to the first section.

11. A metering system for an air cart, comprising:
a metering subassembly, comprising:
  a first meter module configured to meter particulate material from a storage tank of the air cart to a first section of an agricultural implement;

a second meter module configured to meter the particulate material from the storage tank of the air cart to a second section of the agricultural implement;

a controller having a processor configured to:

receive a prescription rate map indicative of a first prescribed product application rate for the particulate material across a first geographic region of a field and a second prescribed product application rate for the particulate material across a second geographic region of the field;

receive signals indicative of respective geographic locations of the first section and the second section relative to the field; and independently adjust the first meter module and the second meter module based at least in part on the prescription rate map and the respective geographic locations as the agricultural implement travels through the field, wherein the processor is configured to determine a blended product application rate from the first prescribed product application rate and the second prescribed product application rate while the first section is located within both the first region and the second region of the field, and to adjust the first meter module to facilitate application of the particulate material at the blended product application rate while the first section is located in both the first region and the second region of the field.

12. The metering system of claim 11, wherein the processor is configured to receive a signal indicative of a speed of the agricultural implement and to independently adjust the first meter module and the second meter module based at least in part on the speed as the agricultural implement travels through the field.

13. The metering system of claim 11, wherein the processor is configured to receive a first product delivery time indicative of a time to deliver the particulate material from the storage tank to the first section, and the controller is configured to adjust the first meter module based at least in part on the first product delivery time as the agricultural implement travels through the field.

14. The metering system of claim 11, wherein the blended product application rate is determined based on a first percent overlap between the first section and the first region of the field and second percent overlap between the first section and the second region of the field.

15. The metering system of claim 14, wherein processor is configured to perform linear interpolation to determine the blended product application rate.

16. The metering system of claim 11, wherein the blended product application rate comprises an average of the first prescribed product application rate and the second prescribed product application rate.

17. The metering system of claim 11, wherein the processor is configured to determine a first percentage of the first section that is located within the first region and a second percentage of the first section that is located within the second region, and to adjust the first meter module to facilitate application of the particulate material at the first prescribed product application rate if the first percentage is greater than the second percentage and to adjust the first meter module to facilitate application of the particulate material at the second prescribed product application rate if the first percentage is less than the second percentage.

18. A method for metering particulate material from an air cart to an agricultural implement, comprising:

receiving, at a processor of a metering system, a prescription rate map indicative of prescribed product application rates for the particulate material for respective geographic regions of a field;

receiving, at the processor, signals indicative of respective geographic locations of a first section and a second section of the agricultural implement relative to the field, wherein the first section and the second section each comprise one or more row units configured to deposit the particulate material into the field;

receiving, at the processor, a signal indicative of a speed of the agricultural implement;

adjusting, using the processor, a first metering rate of a first meter module configured to meter the particulate material from a storage tank of the air cart to the first section and a second metering rate of a second meter module configured to meter the particulate material from the storage tank of the air cart to the second section based at least in part on the prescription rate map, the signals indicative of the respective geographic locations of the first section and the second section, and the signal indicative of the speed of the agricultural implement, wherein the first metering rate and the second metering rate enable the one or more row units of the first section and the one or more row units of the second section to deposit the particulate material into the field at the prescribed product application rates in respective geographic regions of the field; and generating, using the processor, a blended product application rate based on a first prescribed product application rate for a first geographic region of the field and a second prescribed product application rate for a second geographic region of the field in response to the first section being located within both the first geographic region and the second geographic region of the field.

19. The method of claim 18, comprising receiving, at the processor, a first product delivery time indicative of a time to deliver the particulate material from the air cart to the first section, wherein the processor is configured to determine the first metering rate based at least in part on the first product delivery time.

20. The method of claim 18, comprising adjusting, using the processor, the first metering rate of the first meter module to enable the one or more row units of the first section to deposit the particulate product at the blended product application rate in response to the first section being located within both the first geographic region and the second geographic region of the field.

* * * * *